US007136785B2

(12) United States Patent
Mast et al.

(10) Patent No.: US 7,136,785 B2
(45) Date of Patent: Nov. 14, 2006

(54) BOLTED JOINT STATISTICAL SPREADSHEET

(75) Inventors: Donald R. Mast, Decatur, IL (US); Robert L. McNabb, Monticello, IL (US); Christopher J. Russo, Hermosa Beach, CA (US)

(73) Assignee: Caterpillar Inc., Peoria, IL (US)

( * ) Notice: Subject to any disclaimer, the term of this patent is extended or adjusted under 35 U.S.C. 154(b) by 481 days.

(21) Appl. No.: 10/400,307

(22) Filed: Mar. 27, 2003

(65) Prior Publication Data

US 2004/0194019 A1    Sep. 30, 2004

(51) Int. Cl.
*G06F 17/50*    (2006.01)
(52) U.S. Cl. .................. 703/1; 703/6; 703/7; 715/500; 715/900; 702/34; 702/42
(58) Field of Classification Search ............... 703/1–7; 706/11, 12; 716/2; 702/42, 34; 715/500, 715/900
See application file for complete search history.

(56) References Cited

U.S. PATENT DOCUMENTS

| | | | |
|---|---|---|---|
| 5,278,775 A * | 1/1994 | Bibel ........................... 702/42 |
| 5,754,738 A * | 5/1998 | Saucedo et al. ............... 706/11 |
| 6,132,108 A * | 10/2000 | Kashiwamura et al. ......... 703/2 |
| 6,148,494 A * | 11/2000 | Bauer et al. ............. 29/407.05 |
| 6,477,471 B1 * | 11/2002 | Hedstrom et al. ............. 702/34 |
| 6,850,921 B1 * | 2/2005 | Becker et al. .................. 706/12 |
| 6,904,395 B1 * | 6/2005 | DeJack et al. .................. 703/7 |
| 6,931,366 B1 * | 8/2005 | Wang et al. ..................... 703/2 |
| 2002/0107673 A1 * | 8/2002 | Haller et al. ..................... 703/1 |
| 2003/0229476 A1 * | 12/2003 | Naganarayana et al. ....... 703/1 |
| 2004/0143798 A1 * | 7/2004 | Washizawa et al. ........... 716/2 |

OTHER PUBLICATIONS

"FASTENER Thread Strength Analysis Program", Bolt Science Limited, Jan. 2000.*
"Using Excel to Estimate Parameters from Observed Data: An Example from Source Memory Data", Dobson et al, UC Berkeley, Mar. 2001.*
"Precision Machine Design", A. Slocum, Topic 13, Design of joints and bearing rails, 1994.*
"New ideas reshape solid modleing", Dunn, Machine Design, Feb. 2001.*
How to use the CFS Design Spreadsheet Progarm, Army Corps of Engineers, Oct. 1998.*

* cited by examiner

*Primary Examiner*—Fred Ferris
(74) *Attorney, Agent, or Firm*—Finnegan, Henderson, Farabow, Garrett & Dunner

(57) ABSTRACT

A system and method for statistically analyzing a structural member design is provided to obtain a probability that the structural design will meet predetermined design criteria. The present invention provides for numerous spreadsheets, interrelated by way of a macro, to performing statistical analysis on a design, wherein one spreadsheet accepts design input variables. The design input variables are then evaluated by a number of recommended design criteria. If the design fails to meet the recommended design criteria, the user can establish the design (e.g., optimize it in one embodiment) using the optimization spreadsheet. The optimization spreadsheet established the structural member design by automatically adjusting various design inputs so that the structural member design satisfies as many design criteria as possible. Once the desired design input values are discovered, a probability spreadsheet uses random data points to calculate the probability that the structural member design will fail to meet the design criteria.

8 Claims, 8 Drawing Sheets

FIGURE 6

BOLTED JOINT STATISTICAL SPREADSHEET

TECHNICAL FIELD

The present invention relates to multivariate statistical analysis of structural designs and more specifically to an apparatus and method for determining the probability that a structural member design will meet predetermined design criteria.

BACKGROUND

The importance of testing the accuracy of a proposed structural design can not be understated. Before a structural design layout is physically manufactured, numerous tests are performed to analyze the strengths and weaknesses of the design. Engineers and designers attempt to anticipate every possible situation that may subject the design to failure. To facilitate the testing conditions, engineers set benchmarks or design criteria that the design must meet to be considered a successful design. For example, an engineer analyzing a bolted joint design would subject his design to different conditions in order to determine whether the bolted joint design satisfies predetermined design criteria and under what condition the bolt design will loosen, break, slip or fail. By testing and analyzing the bolted joint design, the engineer is able to redesign the structural member blueprint until the design successfully meets the predetermined benchmarks.

Conventional structural design analysis utilized conservative benchmark estimates or worst case scenarios to determine under what conditions the structural member would fail. These conservative estimates, however, often resulted in the failure of a structural design for a multitude of reasons. First, analyzing a structural design using a conservative benchmark estimate yields simply a binary answer. The structural design either passed an established benchmark or failed an established benchmark. Second, this binary result did not help the engineers to understand the strengths and weaknesses of the design. Third, a variance inherently associated with each conservative benchmark often results in a failed structural member even though the design satisfied the conservative estimate. Fourth, the use of conservative benchmarks often resulted in an "over-designed" structural member, thus increasing in the design and production cost of the member. In light of the problems encountered using conventional structural member design analysis, a method for statistically analyzing a structural design is needed.

The present invention is directed to overcome one or more of the problems set forth above.

SUMMARY OF THE INVENTION

The present invention provides a system, method, computer program and computer programmed product for statistically analyzing a structural member design to determine how the structural design can be altered to improve the accuracy of and confidence in the design. Furthermore, statistical analysis may be used to obtain a probability that the structural design will meet predetermined design criteria.

In one embodiment of the present invention, a spreadsheet, for performing statistical analysis on a structural member design, is capable of accepting a first set of design input variables. The design input variables represent different variables that may affect the structural member. The first set of design input variables are then evaluated by a number of predefined design criteria. Design criteria are recommended guidelines, ranges or benchmarks that a structural member design must satisfy in order to ensure the integrity of the structural member (i.e. prevent member from breaking, slipping or loosening). If the first set of design input variables do not satisfy the design criteria benchmarks, a user may modify the design input variables in an attempt to meet the design criteria benchmarks. Such modifications are referred to as "what if" scenarios.

BRIEF DESCRIPTION OF THE DRAWINGS

The above-mentioned features and advantages of this invention, and the manner of attaining them, will become more apparent and the invention will be better understood by reference to the following description of a preferred embodiment of the invention taken in conjunction with the accompanying drawings, wherein:

FIG. 6 is a screenshot illustrating the optimization feature of the present invention;

DETAILED DESCRIPTION

Definitions

Computer Systems

Figure 1:
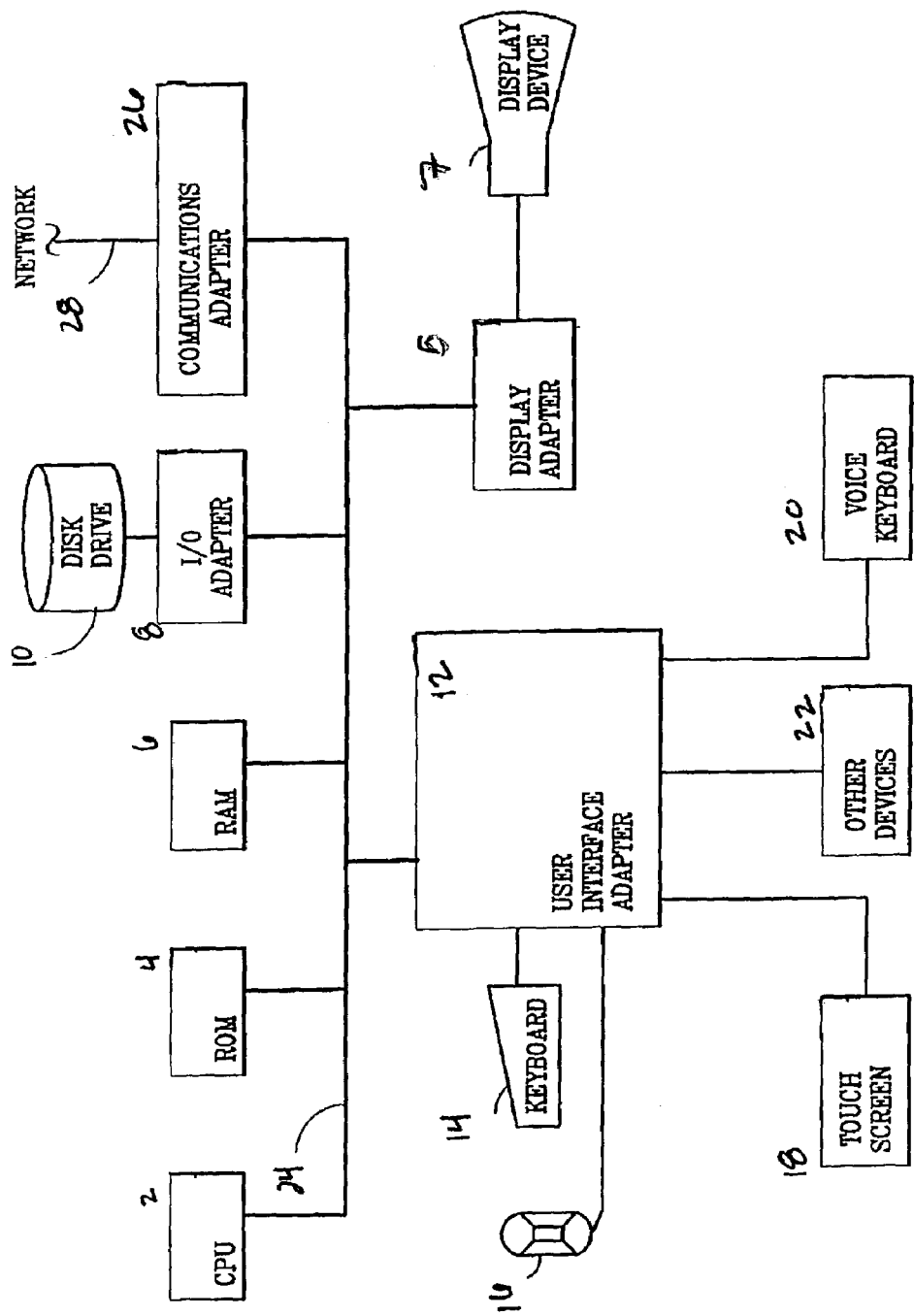
FIG. 1 is a block diagram of a computer system that is capable of implementing the present invention.

One embodiment of this invention resides in a computer system. Here, the term "computer system" is to be understood to include at least a memory and a processor. In general, the memory will store, at one time or another, at least portions of an executable program code, and the processor will execute one or more of the instructions included in that executable program code. It will be appreciated that the term "executable program code" and the term "software" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

Computer Program Products

The above-identified invention may be embodied in a computer program product, as will now be explained.

On a practical level, the software that enables the computer system to perform the operations described further below in detail, may be supplied on any one of a variety of media. Furthermore, the actual implementation of the approach and operations of the invention are actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media", or "computer-readable media", as used here, may include a diskette, a tape, a compact disc, an integrated circuit, a ROM, a CD, a cartridge, a remote transmission via a communications circuit, or any other similar medium useable by computers. For example, to supply software for enabling a computer system to operate in accordance with the invention, the supplier might provide a diskette or might transmit the software in some form via satellite transmission, via a direct telephone link, or via the Internet. Thus, the term, "computer readable medium" is intended to include all of the foregoing and any other medium by which software may be provided to a computer.

Although the enabling software might be "written on" a diskette, "stored in" an integrated circuit, or "carried over" a communications circuit, it will be appreciated that, for the purposes of this application, the computer usable medium will be referred to as "bearing" the software. Thus, the term "bearing" is intended to encompass the above and all equivalent ways in which software is associated with a computer usable medium.

For the sake of simplicity, therefore, the term "program product" is thus used to refer to a computer useable medium, as defined above, which bears in any form of software to enable a computer system to operate according to the above-identified invention.

User Interfaces

The invention is also embodied in a user interface invocable by an application program. A user interface may be understood to mean any hardware, software, or combination of hardware and software that allows a user to interact with a computer system. For the purposes of this discussion, a user interface will be understood to include one or more user interface objects. User interface objects may include display regions, user activatable regions, and the like.

As is well understood, a display region is a region of a user interface which displays information to the user. A user activatable region is a region of a user interface, such as a button or a menu, which allows the user to take some action with respect to the user interface.

A user interface may be invoked by an application program. When an application program invokes a user interface, it is typically for the purpose of interacting with a user. It is not necessary, however, for the purposes of this invention, that an actual user ever interact with the user interface. It is also not necessary, for the purposes of this invention, that the interaction with the user interface be performed by an actual user. That is to say, it is foreseen that the user interface may have interaction with another program, such as a program created using macro programming language statements that simulate the actions of a user with respect to the user interface.

Applications Programs

An application program may be several separate programs, only one program, a module of a program, or even a particular task of a module. An applications program may be written by an applications programmer. Applications programmers develop applications programs using any of a number of programming languages. During development and design of applications programs, applications programmers may adhere to a programming methodology. A programming methodology is a set of principles by which analysis is performed and by which design decisions are made. Programming methodologies may be referred to as programming paradigms. Examples of widely-known programming paradigms include the top-down, the data-driven, and the object oriented (OO) programming paradigms.

The Object Model

The OO paradigm is based on the object model. One of skill in the art readily understands the object model. For detailed information concerning the object model, a useful book is "Object-oriented Analysis and Design", by Grady Booch (Addison-Wesley Publishing Company).

Recently, object oriented analysis and design (OOAD) and object oriented programming (OOP) have been the focus of great attention. OOAD and OOP are thought to provide advantages with respect to abstraction, encapsulation, modularity, and hierarchy. Furthermore, OOAD is thought to provide for improved software reuse and better adaptability to change.

According to the object model, a software system is modeled as collections of cooperating objects. Individual objects are treated as instances of a particular class. Each class has a place within a hierarchy of classes.

An object is understood to have a unique identity, to have a state, and to exhibit behavior. The behavior of an object relates to the set of operations that may be performed by the object. Such operations are also known, interchangeably, as methods of the object or as member functions of the object. Member functions of an object are invoked by passing the object an appropriate message.

An object may retain data of interest. Passing the object appropriate messages may invoke a member function of the object to manipulate the data. For example, an object presently might retain an image of the Washington Monument, and might have a member function for rotating an image. Under the object model, when an appropriate message, such as "rotate image 45 degrees", is passed to the object the rotating member function is invoked and the image is rotated 45 degrees. The image, thus rotated, is retained in this state.

The invoking of member functions of objects to perform tasks is a central concept of the OO paradigm. Objects can be related to each other. Two objects might have a client/supplier relationship. Such objects are said to be linked. Two objects might have a hierarchical relationship. For example, one object might represent a finger and another a hand. The hand object may thus be said to be higher in a hierarchy than the finger. Assuming the hand has more than one finger, there might be several finger objects that are so related with the hand object. Hierarchically related objects are said to be aggregated. In particular, the hand object and its finger objects may be referred to as an aggregate, or an aggregation. The finger objects may be referred to as being attributes, or members of the aggregation. The hand object, by virtue of its position at the "top" of the hierarchy in the aggregation, may be referred to as an aggregating object.

An object cannot be considered without regard to its class. Every object, when constructed, receives its structure and behavior from its class. An object may be referred to as a class instance, or as an instance of a class. Classes, in the object model, may be hierarchically related. In particular, the relationship between two classes may be a subclass/superclass relationship. A subclass may inherit the structural and behavioral features of its superclass.

Thus, whenever an object is constructed, it receives important attributes from its class. If that class is a subclass of a particular superclass, the object may receive certain attributes from the superclass as well.

Class Libraries

Classes, on a practical level, may be supplied in class libraries on any one of a variety of media. Class libraries may be understood to be a kind of software. Thus, the class definitions contained in class libraries also are actually statements written in a programming language that, when executed by a computer, cause the computer to act in accordance with the particular content of the statements. Furthermore, a class library may be provided in any number of forms including, but not limited to, original source code, assembly code, object code, machine language, compressed or encrypted versions of the foregoing, and any and all computer readable equivalents.

One of skill in the art will therefore appreciate that a class library may be embodied in a computer program product as that term has already been defined, above.

Having explained the meaning of various terms, the invention will now be described in detail. Referring now to FIG. 1, a block diagram of a host computer system 1 that is capable of implementing the system of the present invention is shown. The system 1 for statically analyzing structural member designs may be implemented as a group of computer programs, program modules, and computer readable data stored on a computer readable media operating to cause the computer to perform the actions described in this specification. Specifically, the host computer system 1 may be a desktop or portable computer, a workstation, a server, a personal digital assistant, or any other computer system. Host computer system 1 preferably includes a central processing unit ("CPU") 2 such as a conventional microprocessor, a read-only memory ("ROM") 4, a random access memory ("RAM") 6, an input/output ("I/O") adapter 8 for connecting peripheral devices such as disk drives 10, a user interface adapter interface adapter 12 for connecting input devices such as a keyboard 14, a mouse 16, a touch screen 18, a voice keyboard 20 and or other devices 22 to a system bus 24. Communications adapter 26 connects the host computer system 1 to a network 28 and a display adapter 5 connects system bus 24 to a display device 7.

In an exemplary embodiment, the present invention is implemented as a computer program running on a personal computer. The application program utilized to execute the present invention may include, but is not limited to: a spreadsheet application, such as Microsoft Excel ("Excel"), or a database application, such as Sybase. The system of the present invention may also be implemented as a stand-alone program. Furthermore, the system of the present invention may be implemented using numerous operating environments such as, but not limited to, DOS, Linux, Windows, VMS, VAX, BeOS, Solaris, OS/2, Macintosh, UNIX and any future developed operating systems.

A spreadsheet includes a matrix of rows and columns to which labels and numbers can be entered for accounting, budgeting, financial analysis, scientific applications, and other work with figures. The intersection of a row and column is referred to as a cell. A user may define each cell by entering a value or formula into the cell.

The interrelationship between cells make spreadsheets a powerful analytical tool. Spreadsheet cells are relational because a value stored in one cell may affect a value or formula stored in another cell. By modifying a cell value, a user may automatically see how the change to one cell value affects other cell values. This relational feature enables a user to study various "what if" scenarios.

Spreadsheets themselves may also be interrelated. Data entered into one spreadsheet may be linked, via a macro, to formulas contained in another spreadsheet, thereby enabling the second spreadsheet to graphically display the data stored in the first spreadsheet. The interrelationship between cells and spreadsheets, in general, creates a powerful tool that can perform calculations and update thousands of cells instantaneously.

Figure 2:
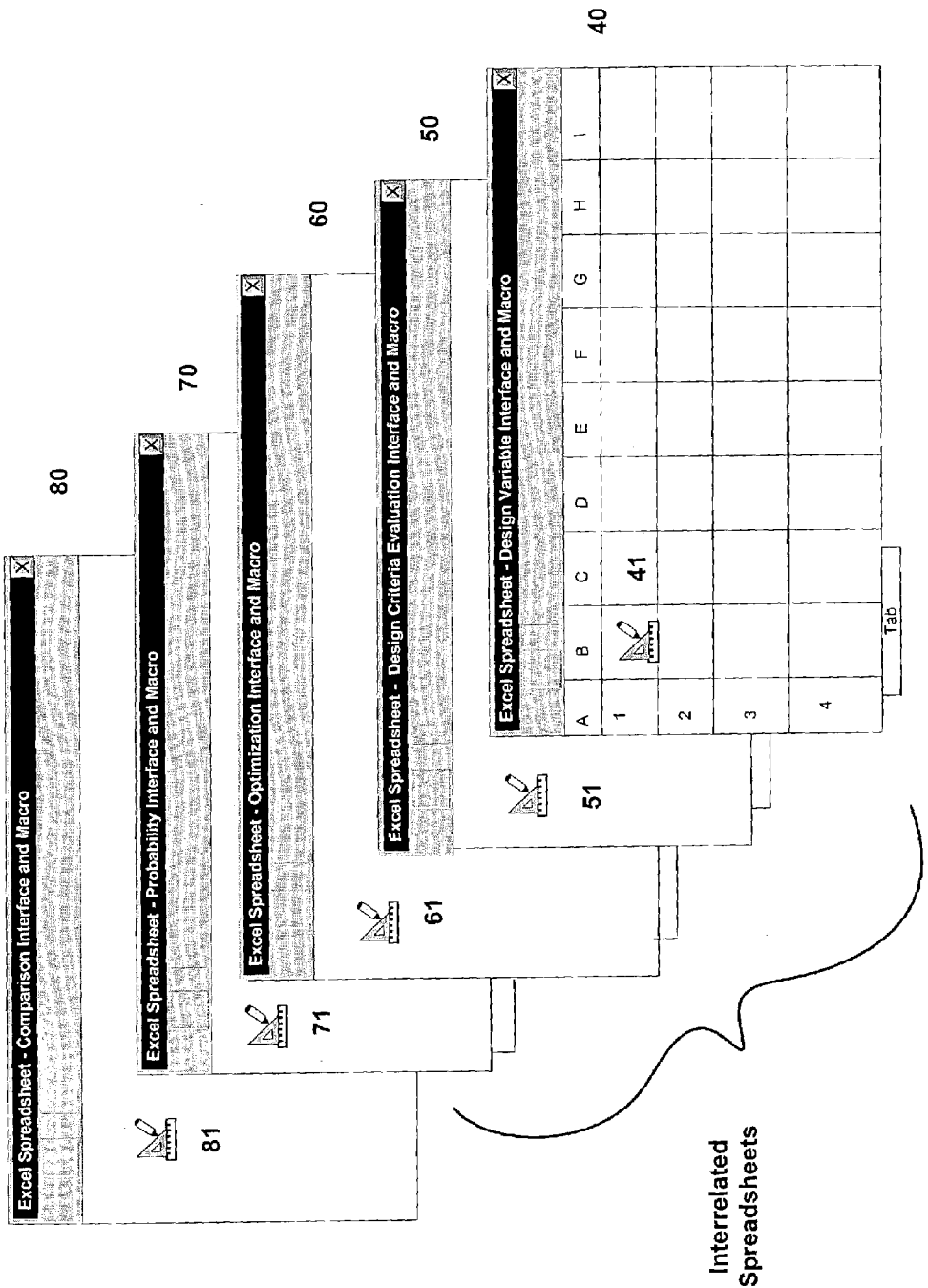
FIG. 2 is block diagram illustrating the interrelationship between the spreadsheets of the present invention.

Referring now to FIG. 2., the interrelationship between numerous spreadsheets, as utilized in the present invention, is shown. A spreadsheet may be interrelated with the data from another spreadsheet via a macro. A macro is a simple program or batch file created by a list of commands, actions, variables and loops.

FIG. 2 illustrates four exemplary spreadsheets of the present invention, namely a design variable interface spreadsheet 40, a design criteria evaluation interface spreadsheet 50, an optimization spreadsheet 60, a probability interface spreadsheet 70 and a comparison spreadsheet 80. As will be described below, the design variable spreadsheet 40 provides design data and variable inputs used to execute the macros associated with the evaluation spreadsheet 50, optimization spreadsheet 60, probability spreadsheet 70 and the comparison spreadsheet 80. The macro icon 41, 51, 61, 71, 81, depicted in FIG. 2 represents the macros used to interrelate the spreadsheets of the present invention.

Figure 3:
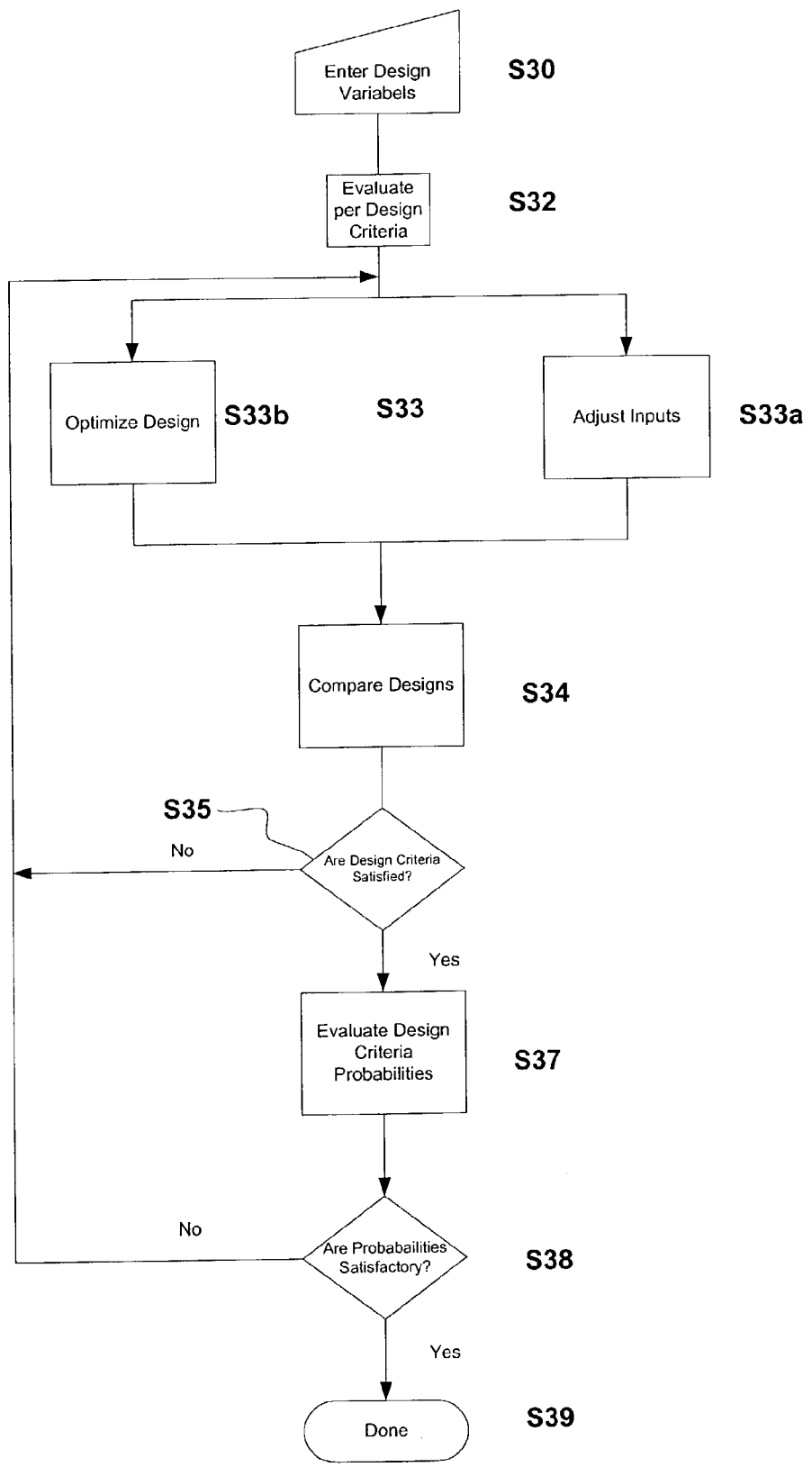
FIG. 3 is a flow chart illustrating the process for analyzing a structural member design.

Turning now to FIG. 3, a flow chart illustrating the process for statistically analyzing a structural member design is shown. A discussions of FIGS. 4–8 illustrating specific screenshots of the present invention will be incorporated into the process description as required. Furthermore, the system for performing statistical analysis on a structural member of the present invention will be described herein with exemplary references to bolted joint designs. It is important to note however, that the system as described herein, may be utilized to analyze numerous structural member designs and therefore should not be limited to bolted joint designs.

As disclosed above, testing and analyzing a structural member design, such as a bolted joint design, is of highest importance. A design for a bolted joint is tested to determine how robust the actual design is. For example, before a bolted joint design is physically manufactured, an engineer should understand the limitations of the bolt/design and, more importantly, the conditions under which the bolt will loosen, slip, break or fail (these situations are referred to as "failure modes".) Furthermore, an engineer should take into account various tolerances, conditions and variables in order to accurately estimate strengths and weaknesses of the design. Such consideration will thus provide the engineer with information that may be used to improve the quality of the bolted joint design (and to avoid "over-designing" the joint).

Therefore, to initiate the system for performing structural analysis, the user enters desired design variables S30, as depicted in FIG. 3. In a preferred embodiment, a user accesses the design variable spreadsheet 40 of the present invention. The design variable spreadsheet 40 is interrelated with the design criteria evaluation spreadsheet 50, the optimization spreadsheet 60, the probability spreadsheet 70 and the comparison spreadsheet 80, by way of a design variable macro.

Figure 4:
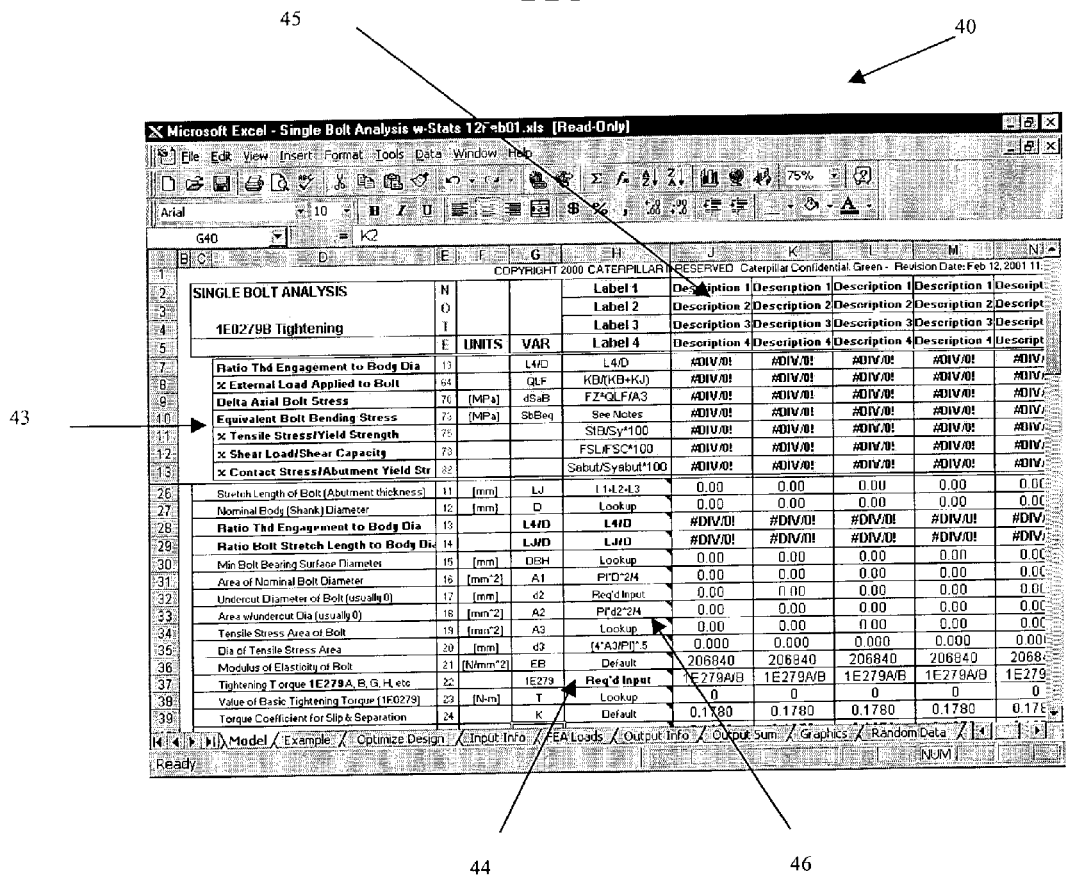
FIG. 4 is a screenshot of an input variable spreadsheet.

A screenshot of the design variable spreadsheet 40 is depicted in FIG. 4. Specifically, the design variable spreadsheet 40 is preformatted with properties 43 enabling the analysis of a bolted joint design. These properties 43 relate to the material properties of the iron and steel used to make the bolt such as: minimum proof load stress, mean yield strength and modulus of elasticity of the bolt. Other properties, however, are used to account for the geometry's of the joint such as: area of nominal bolt diameter, area with undercut diameter and diameter of tensile stress area. Various material and geometric properties are associated with hard coded values based on look-up tables and bolted joint equations calculated values 46. Other properties, referred to as required design inputs or design variables 44, are dependent upon the actual bolted joint design being analyzed by the user. For example, a value for the tightened torque property is dependent upon the user's design and therefore must be entered accordingly by the user.

A portion of the design inputs 4 are entered into the first available design iteration column 45, namely column J. Other design iterations are entered into subsequent columns such as K, L, M and N. A design iteration is an alternate set or modified set of design inputs (such as modifying the value of a required design variable for the tightened torque property by increasing or decreasing the value by a predetermined amount). By changing design inputs 44 in the design iteration columns 45, as user recognizes the effect such changes have on other values and the overall design. Thus, referring back to FIG. 3, a user initiates the system for performing structural analysis on a bolted joint design by entering the design inputs S30.

Upon entering the design inputs S30, the system of the present invention evaluates the design inputs 44 using predefined design criteria S32 as described in FIG. 3. Design criteria are recommended guidelines, ranges or benchmarks that a structural member design may satisfy in order to ensure the integrity of the structural member (i.e. prevent member from breaking, slipping or loosening). By way of example and not limitation, a bolted joint design may be evaluated by ten design criteria, half of which are based on geometric requirements such as force ratio, compressive stress, preload loss, thread engagement ratio and joint length diameter. The other five design criteria may be based on external loading requirements such as shear capacity, remaining clamp force, total bolt stress, delta axial force and equivalent bending stress.

Figure 5:
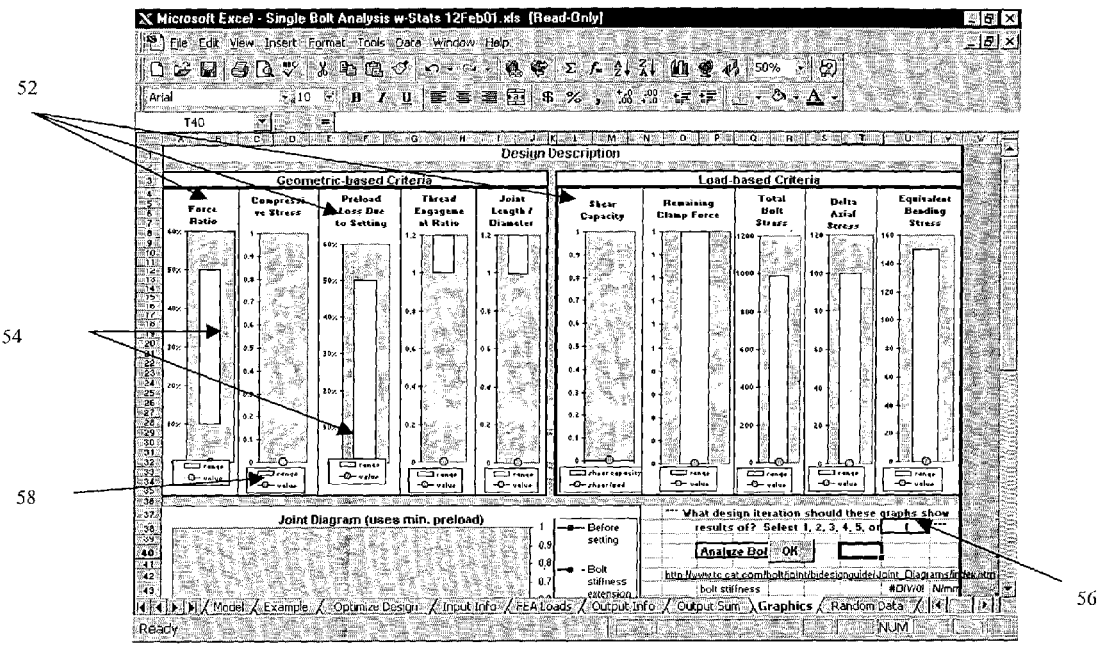
FIG. 5 is a screenshot illustrating the design criteria having predetermined desired ranges.

FIG. 5 shows a graphical illustration of the design criteria 52 and their acceptable ranges 54, and thereby presents a visual representation of the robustness of the design. The design criteria evaluation spreadsheet 50 is interrelated with the design variable spreadsheet 40, the optimization spreadsheet 60, the probability spreadsheet 70 and the comparison spreadsheet 80, by way of a design criteria evaluation macro 51.

The design criteria evaluation spreadsheet 50 evaluates the variables from the design variable input spreadsheet 40 in light of the predefined design criteria 52. To initiate the evaluation, a user enters, in the appropriate cell 56, the number of the iteration column 45 to be analyzed. The design criteria evaluation macro 51 determines a calculated value 58 for each design criteria 52 using the variables from the design variable input spreadsheet 40 and predefined equations. The macro then plots a calculated value 58 for a design criteria 52 on the appropriate graph. Accordingly, the graph provides a convenient method for determining whether the calculated value 58 falls within the recommended range 54 for the design criterion 52.

In an alternate embodiment, the system of the present invention may include an output spreadsheet, initialized when a calculated value 58 falls outside the design criteria range 54. The output spreadsheet provides suggestions as to what variable may be changed in order to satisfy the design criteria.

Upon determining which design criteria 52 are not met by the bolted joint design being analyzed by the system of the present invention, a user may change the design variable input 44 values in an attempt to satisfy the design criteria 52. Thus, the user may perform numerous "what if" scenarios S33 to analyze how variable changes will influence the overall design. As depicted in FIG. 3, the design input variables 44 may be modified manually S33a or via the optimization spreadsheet S33b.

A user may manually modify S33a the design input variables 44 by entering adjust values for the required design input variables 44 into the design iteration columns K, L, M and N 45. Of course, the user is not required to change all the design input variables 44. A single design input variable 44 may be changed thereby enabling the user to see how design criteria 52 or certain aspect of the design are affected. For example, the user may change the bolt material property 43 from aluminum to steel in an effort to make the abutment stiffer thereby improving the force ratio design criterion.

The system of the present invention further provides an optimization spreadsheet 60 that automates the "what if" scenario process. The optimization spreadsheet 60 is interrelated with the design variable spreadsheet 40, the design criteria evaluation spreadsheet 50, the probability spreadsheet 70 and the comparison spreadsheet 80, by way of an optimization macro 61.

Figure 6:
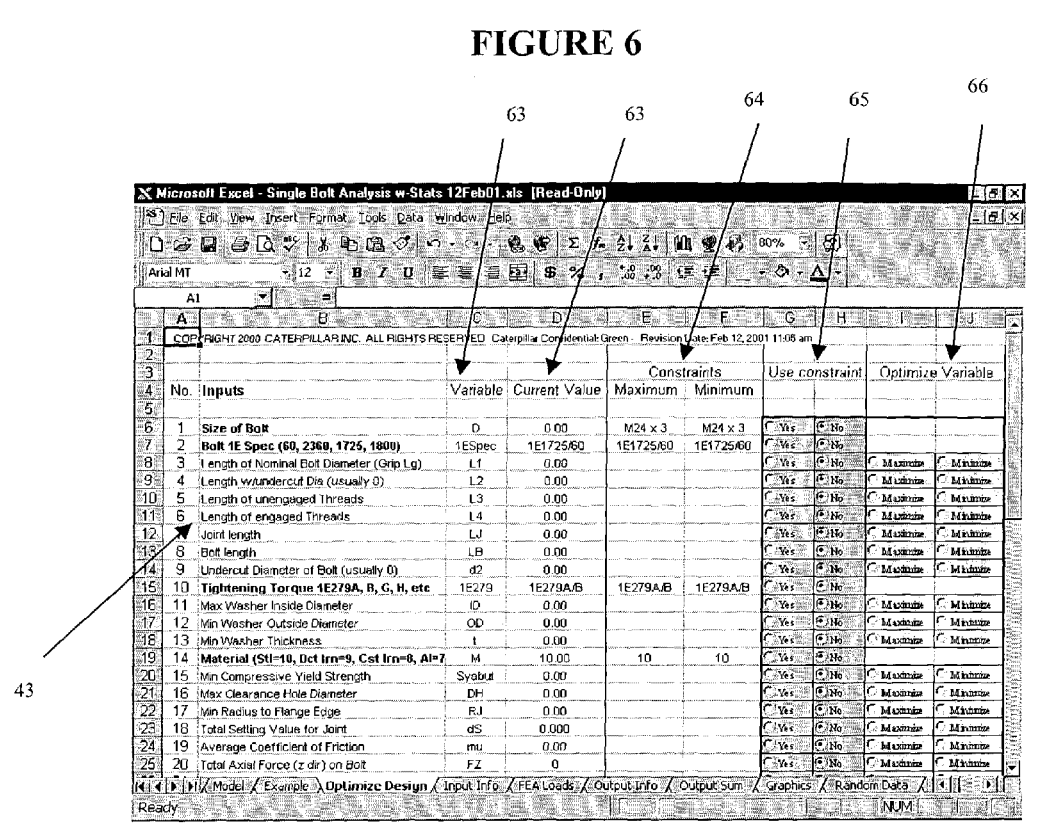

The optimization spreadsheet, as depicted in FIG. 6, contains a macro for optimizing the design input variables 44 to a value wherein as many of the design criteria as possible are satisfied. In other words, the optimization spreadsheet 60 calculates the desired values, which may be perceived optimal values, for the design input variables 44 that will provide the best bolted joint design. Of course, all the design criteria may have an associated desired value, however, a value is also sufficient if it falls within the given range.

To utilize the optimization spreadsheet 60, a user chooses the inputs and design criteria to be constrained by providing maximum and minimum values for the constraints The optimization macro 61 changes the design input variable values 63 for each property 43 the user chooses to constrain by highlighting "yes" 64. Thus, the optimization macro 61 may optimize the values for the hard-coded variables 46 and the required design input variables 44. If a user decides not to constrain a variable ("no"), the optimization macro 61 will not change the original value of the variable.

The optimization macro 61, as represented in FIG. 2, may simply be used to adjust the design variables by focusing on meeting as many of the design criteria 52 as possible. Alternatively, using the optimize variable columns 66, a user may minimize or maximize a specific design input variable 44 or a design criterion 52. In doing so, the optimization macro 61 will seek to optimize the specified variable while meeting the given constraints (i.e.: the maximum and minimum values of the constrained variables.).

The optimization macro 61 may further be instructed to find a design input variable 44 that allows a specific design criteria 52 to be met, or the macro 61 may take several constraints 65/66 into consideration in order to find a design that satisfies each design criteria 52. In addition, a specific design input variable 44 may be constrained to see how variations of the variable will affect the design criteria 52. By way of example and not limitation, the optimization spreadsheet may be used to solve the following:

Given certain constraints, what is the greatest external force the design can handle?

In order to minimize abutment material, what is the smallest RJ[1] that can be used while still meeting all ten design criteria?

[1] RJ represents the minium distance (radius) from the bolt centerline to the edge of the abutment material that is being compressed.

How thick should the washer be to avoid exceeding the recommended compressive stress value?

What is the maximum clamping force the design can retain?

The optimization spreadsheet 60 is interconnected with the design variable spreadsheet 40. Therefore, a user may execute numerous optimization scenario wherein the results are automatically placed in the available design iteration columns 45 located on the design variable spreadsheet 40. Thus, each design iteration column 45 may be utilized to establish a desired value (e.g., an optimal value in one embodiment) for each different variable. For example, design iteration column J may be used to maximize the external force variable, while design iteration column K may be used to maximize the LJ/D[2u] design criteria. Utilizing the design iteration columns 45 to optimize variables allows the user to compare each optimized design scenario S34 and thus determine which variables result in the best design.

[2u] LJ/D is the ratio of the bolt stretch length to the body diameter.

Returning now to FIG. 3, a determination S35 is needed as to whether a design scenario fails to satisfy the design criteria, after the variables have been optimized S33 and compared S34 to other design scenarios. If the variable fails to meet the required recommended design criteria, a user may continue to tweak the design (NO—path from S35) using the optimization feature or by manually entering constraints S33. However, if the optimization spreadsheet 60 yields an acceptable design that satisfies the design criteria (YES—path from S35), a user may statistically analyze the probability that the design will not meet the recommended design criterion values S37.

Figure 7:
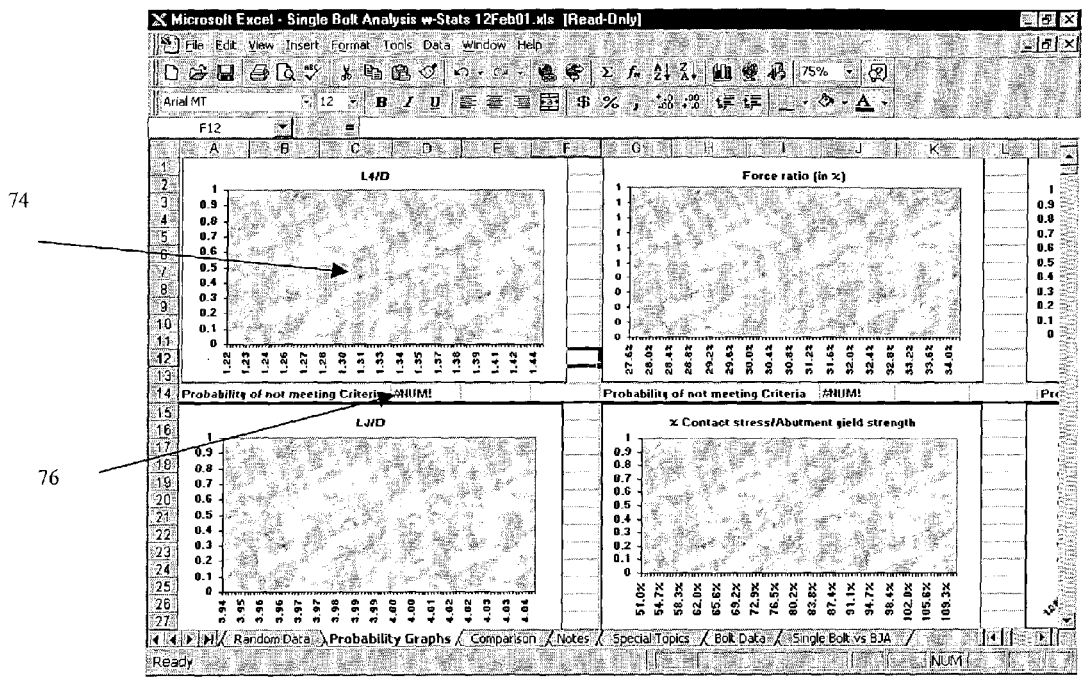
FIG. 7 is a screenshot illustrating the statistical probability function for each design criteria of the present invention.
Figure 7:
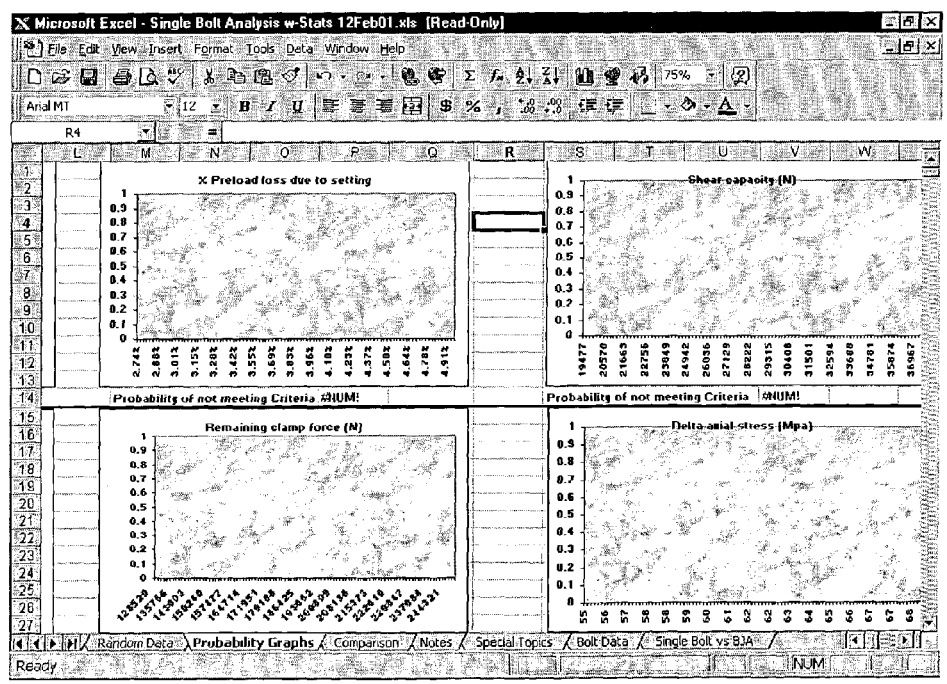

FIG. 7 is a screenshot of the probability spreadsheet of the present invention. The probability spreadsheet 70 is interrelated with the design variable spreadsheet 40, the design criteria evaluation spreadsheet 50, the optimization spreadsheet 60 and the comparison spreadsheet 80, by way of the probability macro 71.

The probability spreadsheet 70 evaluates bolted joint design variables against the design criteria 52 to determine the robustness of the design. Thus, the probability spreadsheet 70 shows the probability, graphically 74 and numerically 76, that the design might not meet the recommended values for the design criteria 52 by taking into account the tolerance variation of error for each variable and design criterion.

The probability macro 71 performs statistical analysis using random variables to generate random data points. Specifically, the probability macro 71 takes eighteen random variables into consideration and generates random data points for each random variable. The eighteen random variables include: bolt diameter, undercut diameter, thickness of clamped parts, thickness of part with threaded hole, unthreaded shank length, undercut diameter length, internal thread chamfer, total bolt length, hole diameter, external thread chamfer, bearing head diameter, washer thickness, washer I.D., washer O.D., torque constant K, setting, bolt yield strength, and abutment strength. The system of the present invention, however, should not be limited to these specific random variables, therefore other variable utilized for such analysis are within the scope of this invention.

Although not shown in FIG. 7, a user enters the number of random data points to be generated by the probability macro 71. For example, if the user desires a highly accurate probability, the user may ask the probability macro 71 to generate 5000 random data points. If however, the user is merely interested in a general probability, the user instructs the probability macro 71 to generate 500 random data points. The random data points are then used to execute the equations utilized to describe the design criteria 52. Thus, the design criteria 52 are also represented by randomly generated points.

Once the data points have been generated, the probability macro 71 performs a correlation of each design criterion's data points to determine whether the points fall on a normal distribution or a 3-parameter Weibull distribution. After the best distribution is found the probability macro 71 calculates statistical parameters for the distribution, such as the mean and standard deviation. These parameters are used to create a probability density plot of the random data points. The probability density plots give a graphical representation of the percentage chance that the design criteria 52 will fail to be met S37. Thus, the probability macro 71 graphically 74 and numerically 76 advises a user of the chance that the bolted joint design will fail even though the design utilized desired or optimal values and satisfied the recommended design criteria 52.

If the probability is unsatisfactory S38, the user may perform further "what if" scenarios in order to further improve the accuracy of and confidence in the design (NO—path of S38). On the other hand, if the probability is acceptable (YES—path of S38), the user can be assured that the bolted joint design has been optimized to satisfy the recommended design criteria 52, and the analysis is completed S39.

In an alternate embodiment, after performing multiple "what if" scenarios, the design iterations may be compared to one another using the comparison spreadsheet 80. The comparison spreadsheet 80 is interrelated with the design variable spreadsheet 40, the design criteria evaluation spreadsheet 50, the optimization spreadsheet 60 and the probability spreadsheet 70, by way of a comparison macro 81. Specifically, the comparison macro 81 is disclosed as program code in Appendix E.

Figure 8:
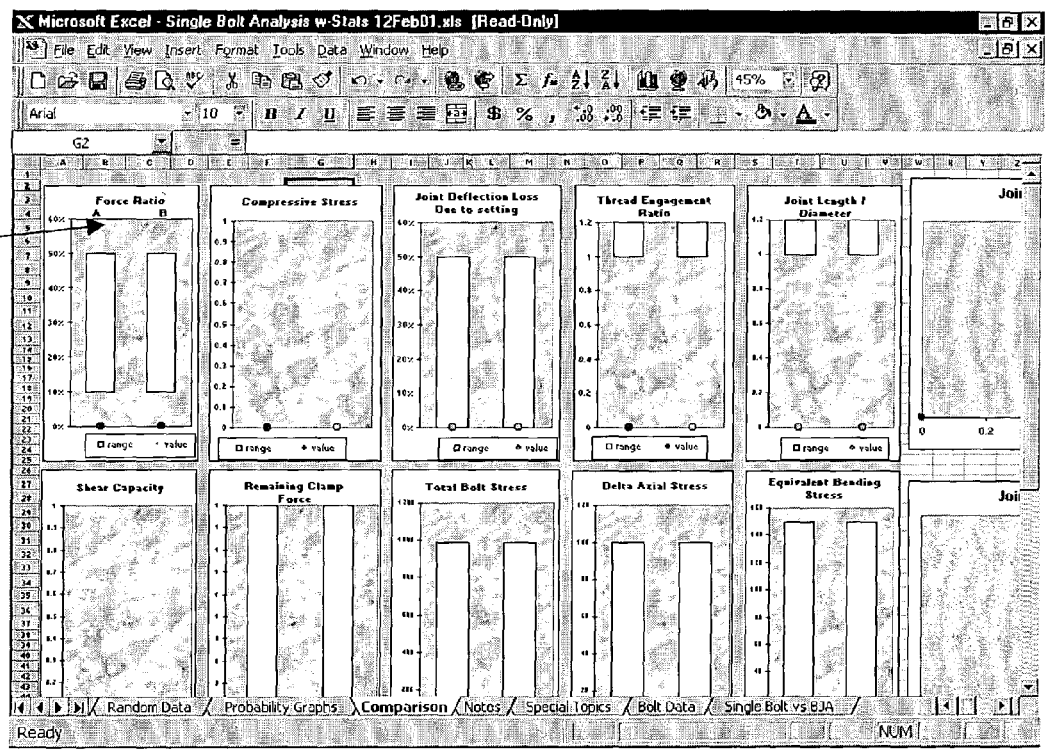
FIG. 8 is a screenshot illustrates the comparison graphs for the design criteria.

As can be seen is FIG. 8, the comparison spreadsheet 80 enables a user to graph two design iterations 82 (herein A is one design iteration and B is an alternate design iteration) with respect to each individual design criteria 52. The comparison spreadsheet 80 thereby enables the user to amalgamate the optimal variables from each criterion in an effort to provide a bolted joint design wherein each design criteria 52 is satisfied.

In light of the above description, the spreadsheet of the present invention is operational to analyze a structural design using statistical analysis methods in order to simulate the physical structural member by integrating input design values, predefined design criteria, equations and graphical representations with one another thereby allowing a user to instantaneously identify the strengths and weaknesses in a proposed design.

Appendices A–E, attached herein, disclose a preferred embodiment of the system of the present invention. Only the most pertinent macros utilized by the present invention are disclosed, while others would be obvious to one of ordinary skill in the art.

What is claims is:

1. A method for statistically analyzing the robustness of a design using predefined design criteria comprising:
   entering at least one design variable, wherein said at least one design variable represents at least one of a measurement and tolerance associated with a design of a structural member;
   evaluating said at least one design variable against one or more design criteria, said one or more design criteria having one or more respective desired values, in order to determine whether said at least one design variable satisfies said respective desired values of said one or more design criteria, thereby forming a first design result;
   adjusting said at least one design variable to satisfy said one or more respective desired values of said one or more design criteria by entering at least one adjusted design variable;
   evaluating said at least one adjusted design variable against said one or more design criteria in order to determine whether said at least one adjusted design variable satisfies said respective desired values of said one or more design criteria, thereby forming a second design result;
   comparing said first design result with said second design result to determine a design result that satisfies, within a predetermined range, said one or more design criteria; and
   for a design result that satisfies, within the predetermined range, said one or more design criteria, calculating a probability that said design result will not meet said respective desired values of said one or more design criteria, using said calculated probability to analyze the robustness of said design and storing the result.

2. The method for statistically analyzing the robustness of a design using predefined design criteria of claim 1, wherein said adjusting of said at least one design variable enables a designer to evaluate a plurality of "what if" scenarios associated with said design of said structural member.

3. The method for statistically analyzing the robustness of a design using predefined criteria of claim 1, further comprising readjusting said at least one design variable until said at least one design variable satisfies said one or more design criteria.

4. The method for statistically analyzing the robustness of a design using predefined design criteria of claim 1, wherein said one or more design criteria are selected from a group comprising one or more of: force ratio, compressive stress, preload loss, thread engagement ratio, joint length diameter, shear capacity, remaining claim force, total bolt stress, delta axial stress, and equivalent bending stress.

5. The method for statistically analyzing the robustness of a design using predefined design criteria of claim 1, wherein if said at least one design variable falls with a normal distribution of said one or more design criteria, said at least one design variable satisfies said one or more design criteria.

6. An apparatus for determining a probability that a structural member design will fail comprising;
   an entry mechanism for accepting at least one design input of said structural member design;
   a design evaluating mechanism operable to evaluate said at least one design input against one or more design criteria having one or more respective optimal values; and
   a probability calculating mechanism operable to calculate the probability that said structural design member will fail to satisfy said one or more design criteria, when said at least one design input satisfies said one or more respective optimal values of said one or more design criteria, a display mechanism for displaying a result based on the calculated probability.

7. The apparatus for determining a probability that a structural member design will fail of claim 6, wherein said one or more optimal values are ranges of optimal values.

8. The apparatus for determining a probability that a structural member design will fail of claim 6, wherein said one or more design criteria are selected from a group comprising one or more of: force ratio, compressive stress, preload loss, threat engagement ratio, joint length diameter, shear capacity, remaining claim force, total bolt stress, delta axial stress, and equivalent bending stress.

* * * * *